UNITED STATES PATENT OFFICE.

GEORGE H. STRONG, OF WARWICK, NEW YORK, ASSIGNOR TO THE GROVE PRODUCTS COMPANY, OF WARWICK, NEW YORK.

HORSE AND CATTLE FOOD.

1,013,696.  Specification of Letters Patent.  Patented Jan. 2, 1912.

No Drawing.  Application filed July 22, 1908. Serial No. 444,822.

*To all whom it may concern:*

Be it known that I, GEORGE H. STRONG, citizen of the United States, residing at Warwick, in the county of Orange and State of New York, have invented certain new and useful Improvements in Horse and Cattle Food, of which the following is a specification.

My invention relates to a new and useful improvement in horse and cattle food. Its object is the preparation of a food of this character in a simple, cheap, and effective manner from ingredients substantially as hereinafter fully described and specifically pointed out in the claims.

In preparing this food I use the by-products from cake, biscuit, and crackers and products of like nature. These by-products are the clippings in dough form as taken from the bakeries. They are first shredded, dried, and cooked and then ground in a mill. If desired the food may be molded into cakes or blocks, but this is immaterial.

In order that the various steps in the manufacture of the food may be more clearly understood, I will describe the preferred mechanism which has been found to do the work successfully. The ingredients are first put in the shredder, which may be of any of the well-known types, provided with cylinders, having teeth arranged closely together and adapted to shred the material. After this operation the ingredients are placed in wire screens which are passed into a steam heated box heated to about 300° and allowed to remain there until the ingredients are thoroughly dried for grinding. The ingredients may be then ground in any of the generally used grinders, but I preferably use a grinder of the "plate mill type," which has been found to very successfully do the work. After grinding, the food is put up in packages all ready for use.

It can be seen that the foregoing food may be easily as well as very cheaply made, as the by-products of bakeries are very often wasted, and by using them for a food of this character the expense of preparing the food is greatly reduced and may be sold at a very low figure.

Having fully described my invention, what I claim as new and desire to secure by Letters Patent is:—

1. The herein-described method of manufacturing a food for horse and cattle which consists in utilizing the clippings and waste from bakeries, first by shredding, then drying, and then baking them, and finally grinding the mass in a mill.

2. The herein-described method of manufacturing a food for horse and cattle which consists in utilizing the clippings and waste from bakeries, first by shredding, then drying, then baking them, grinding the mass in a mill, and finally molding the ground material into cakes or blocks.

3. The herein-described method of manufacturing a horse or cattle food made from the clippings, in dough form, of cake, biscuit and crackers, the same being shredded, dried, baked and finally ground.

In testimony whereof I affix my signature, in the presence of two witnesses.

GEORGE H. STRONG.

Witnesses:
 LEWIS J. STAGE,
 ALICE M. LAURENCE.